Feb. 26, 1957  B. E. SMALLRIDGE  2,782,809
COIL WINDING MACHINE
Filed Jan. 25, 1954  4 Sheets-Sheet 1
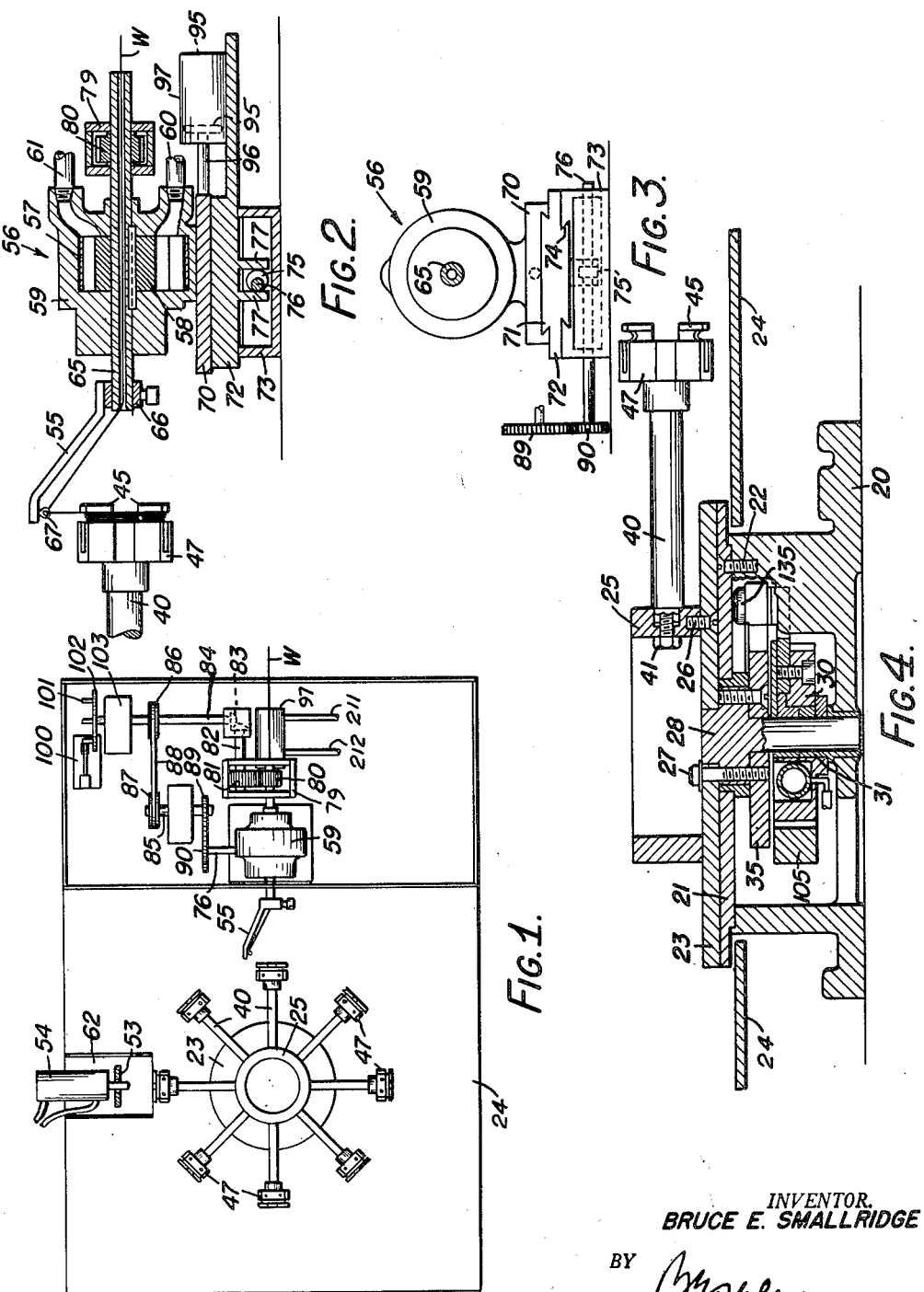
INVENTOR.
BRUCE E. SMALLRIDGE
BY
ATTORNEY Feb. 26, 1957  B. E. SMALLRIDGE  2,782,809
COIL WINDING MACHINE
Filed Jan. 25, 1954  4 Sheets-Sheet 2
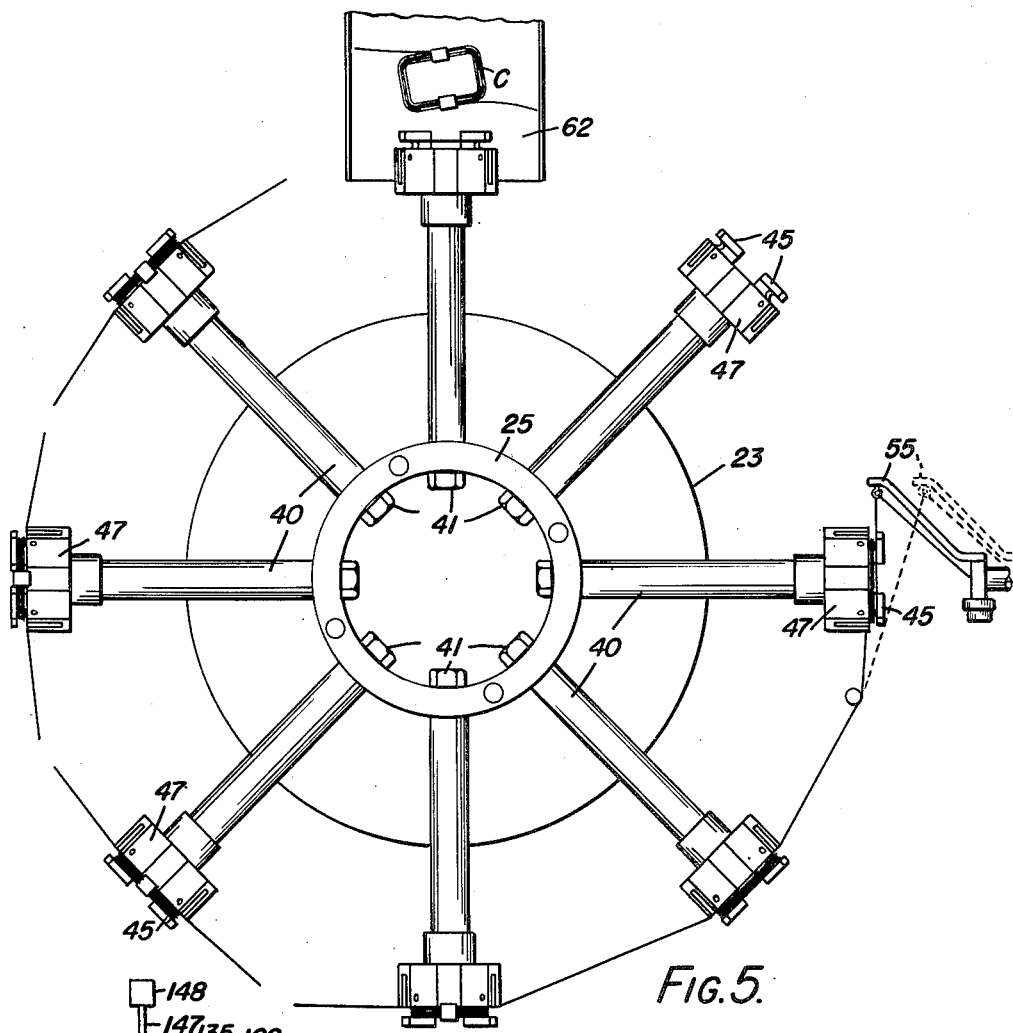
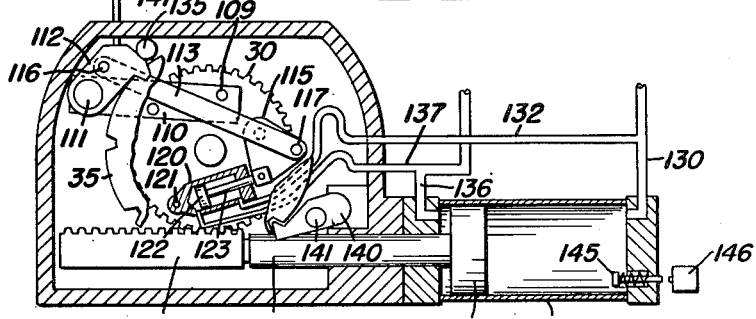
INVENTOR.
BRUCE E. SMALLRIDGE
ATTORNEY Feb. 26, 1957 B. E. SMALLRIDGE 2,782,809
COIL WINDING MACHINE
Filed Jan. 25, 1954 4 Sheets-Sheet 3
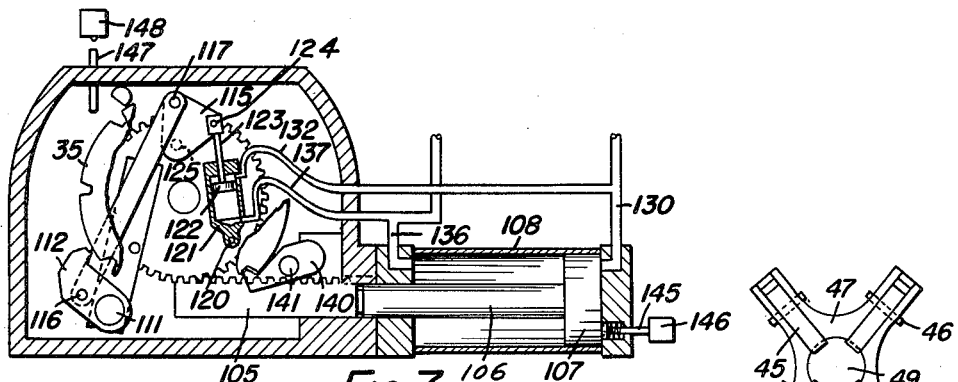
FIG. 7.
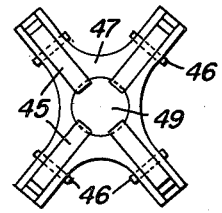
FIG. 8.
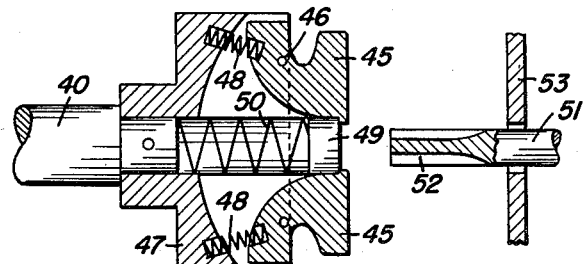
FIG. 9.
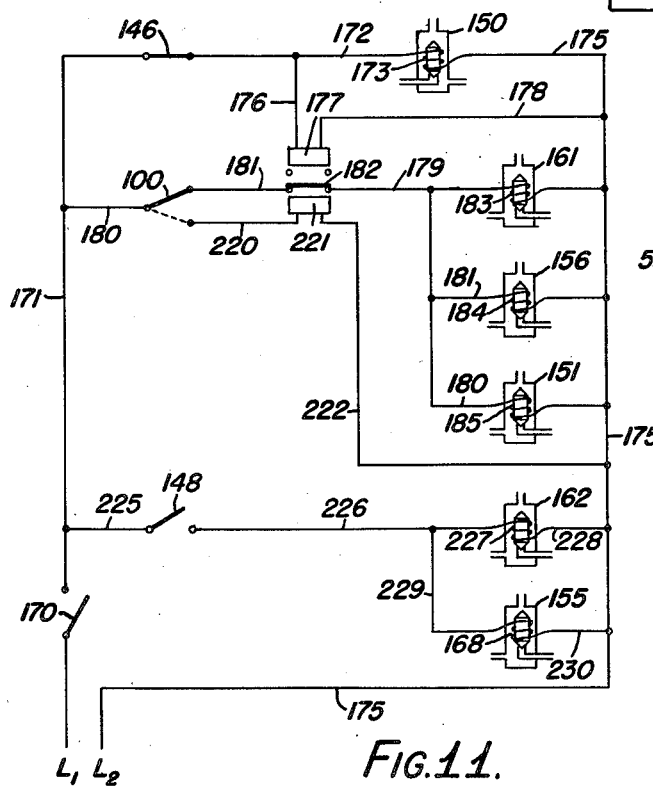
FIG. 10.
FIG. 11.
INVENTOR.
BRUCE E. SMALLRIDGE
BY
ATTORNEY Feb. 26, 1957  B. E. SMALLRIDGE  2,782,809
COIL WINDING MACHINE
Filed Jan. 25, 1954  4 Sheets-Sheet 4

INVENTOR.
BRUCE E. SMALLRIDGE
BY
ATTORNEY

United States Patent Office 2,782,809
Patented Feb. 26, 1957

2,782,809
COIL WINDING MACHINE

Bruce E. Smallridge, Irondequoit, N. Y., assignor to Genesee Machine Builders, Inc., Irondequoit, N. Y., a corporation of New York Application January 25, 1954, Serial No. 405,812

9 Claims. (Cl. 140—92.1)

The present invention relates to wire coil-winding machines particularly to machines for winding coils for small motors, solenoids and the like.

With the wire coil-winding machines heretofore known, difficulty has always been experienced in controlling precisely the number of turns of wire in a coil. Conventional coil-winding machines are driven by electric motors. It is impossible to secure instantaneous stoppage of an electric motor; the motor coasts some; and this may cause one or more turns of wire above those desired to be wound upon the coil.

In wire coil-winding machines of previous construction, moreover, difficulty is sometimes experienced in stripping the coils from the supports or mandrels, on which they are wound, after the winding of a coil has been completed.

One object of the present invention is to provide a wire coil-winding machine in which the number of turns of wire wound into a coil can be controlled precisely.

A concomitant object of the invention is to provide a coil-winding machine in which the winding mechanism is driven by a hydraulic motor that can be stopped and started instantaneously.

Another object of the invention is to provide a coil-winding machine from which the coils can readily be removed.

Another object of the invention is to provide a coil-winding machine in which collapsible chuck jaws are provided on which the coils are wound, and which can be collapsed to permit discharge of a coil therefrom.

Another object of the invention is to provide a coil-winding machine which will be fully automatic in operation except for the steps of fastening the turns of wire temporarily together and of separating (clipping) one coil from another.

Another object of the invention is to provide a machine of the character described which will be relatively simple in construction, rugged, and which will not easily get out of order.

Other objects of the invention will be apparent hereinafter from the specification and from the recital of the appended claims.

In the drawings:

Fig. 1 is a plan view of a coil-winding machine built according to one embodiment of this invention;

Fig. 2 is a vertical section on a somewhat enlarged scale showing the winding head of this machine and one of the sets of collapsible jaws on which the wire is wound in a coil;

Fig. 3 is an end view of the winding head looking from the left of Fig. 2, but omitting the flyer, and showing its shaft in section;

Fig. 4 is a vertical section on an enlarged scale through the turret which supports the spindles that carry the jaws on which the coils are wound;

Fig. 5 is a plan view of this turret, showing also fragmentarily the flyer or winding finger;

Fig. 6 is a section on an enlarged scale showing the indexing mechanism for the turret in one extreme position;

Fig. 7 is a corresponding section showing the indexing mechanism in the other extreme position;

Fig. 8 is a front view of one of the sets of jaws on which a coil may be wound;

Fig. 9 is a diametric, axial section through the chuck jaws and showing also the actuating plunger for collapsing the chuck jaws to permit discharge of a coil therefrom;

Fig. 10 is a transverse section showing the hydraulic motor which drives the winding flyer;

Fig. 11 is an electrical wiring diagram of the machine; and

Figure 12:
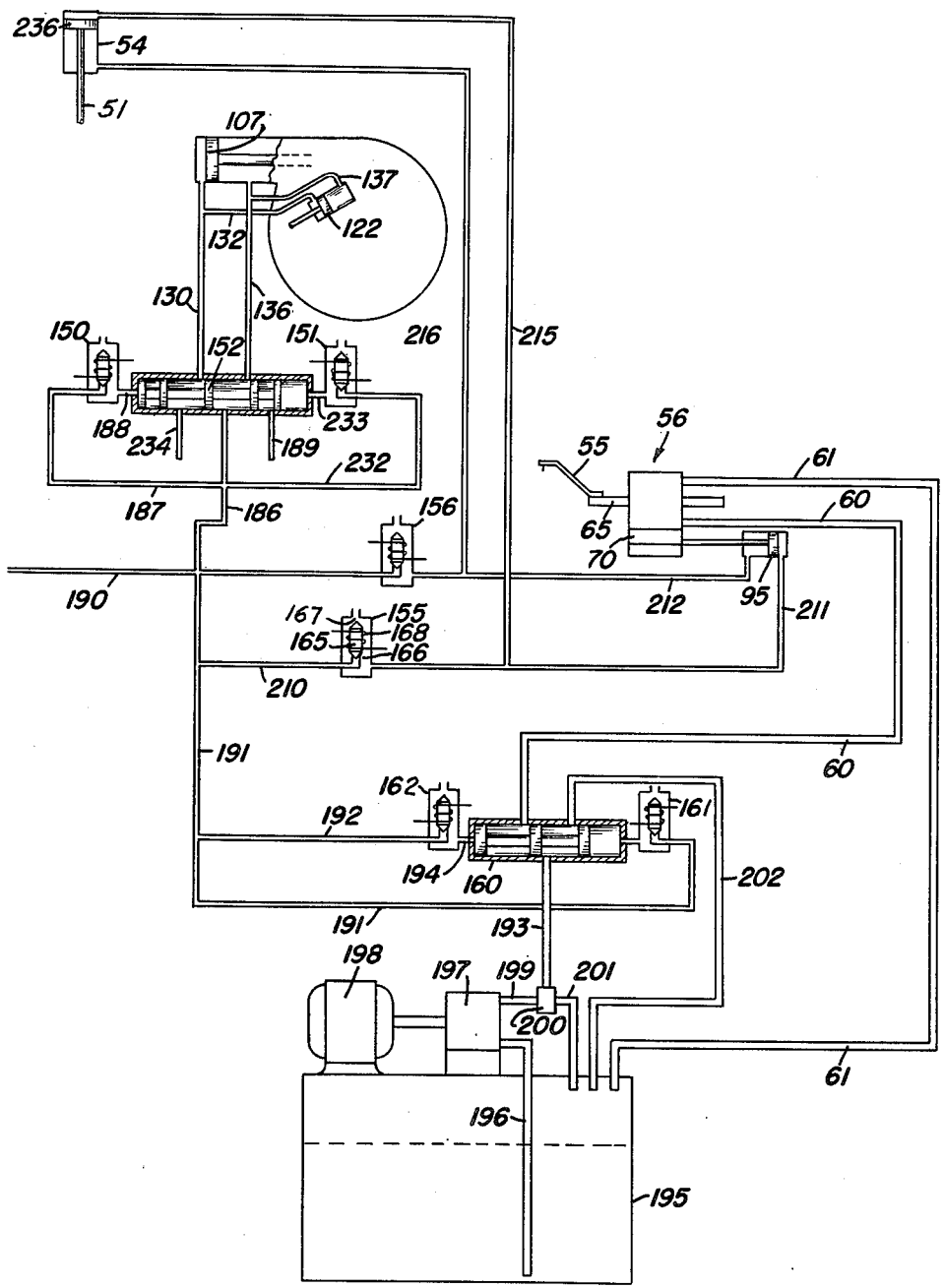
Fig. 12 is a combined pneumatic and electrical wiring diagram of the machine.

In the machine illustrated in the drawings there is a winding finger or flyer that is driven by a hydraulic motor; and there is a turret that carries a plurality of receiver heads (eight in the instance shown) on which the coils are wound. The wire to be wound is fed axially through the hydraulic motor. Each receiver head has four cooperating collapsible jaws. The turret is indexed periodically to move the different receiver heads from station to station. At the winding station, the flyer winds wire on the set of jaws of the receiver head that is at the moment at that station. At an intermediate station, the wire is clipped by an operator to separate one coil from the next coil; and at this intermediate station, also, the practice is for the operator to put a piece of adhesive tape or the like around the coil to hold the turns of wire together in the coiled form. At the discharge station, the jaws are collapsed, discharging the coil carried thereby down a discharge chute which carries it out of the machine. The flyer is moved back and forth axially of the receiver head, that is at the winding station, by an eccentric driven from the hydraulic motor. Thus the flyer lays down successive turns of wire in positions axially displaced from one another, as required. The turret is indexed by a suitable indexing mechanism that is actuated intermittently through means driven from the hydraulic motor. Prior to indexing, the winding head is moved back so that it will be clear of the turret-carried parts during indexing, and after indexing the winding head is again returned to operating position.

Referring now to the drawings by numerals of reference 20 (Fig 4) denotes a base on which the turret is rotatably mounted. This base projects upwardly through an opening in a sheet metal cover or housing 24; and it has a bearing plate 21 secured to it at its top by screws 22. The bearing plate 21 rotatably supports a face plate 23 on which the turret 25 is secured by screws 26. The face plate 23 is fastened by bolts 27 to a spindle 28 that is rotatably journaled in the base 20 in a sleeve 31. A gear 30 forming part of the indexing mechanism for the turret is rotatably mounted through bearing 31 on the spindle 28. The index plate 35, by means of which the turret is locked in any indexed position, is secured to the spindle 28 and face plate 23 by the bolts 27.

The turret rotatably supports a plurality of rods or bars 40 which extend radially from the turret and which are secured in equi-angular relation about the axis of the turret by bolts 41. Each rod or bar 40 carries at its outer end (Figs. 8 and 9) a head 47 and four gripping jaws 45, which together constitute a coil-receiver. Each gripping jaw is pivoted on a pin 46 in its associated head 47; and each head 47 is riveted or otherwise secured to the outer end of the associated bar 40. The jaws of each receiver are constantly urged inwardly toward one another by coil springs 48, one of which is interposed between each jaw and the associated head 47. The jaws of each receiver are normally held in their outer positions by a spring-pressed disc 49 which is constantly urged outwardly by a coil spring 50. Spring 50 is interposed between the disc 49 and the outer end of the associated rod 40, and is housed in a central bore formed in its associated head 47.

The jaws of each receiver head are adapted to be collapsed to discharge a coil therefrom, when the receiver head is at the unloading station, by a plunger 51, which is actuated by air pressure, as will be described further hereinafter. This plunger is adapted to be moved axially of the registering head 47 to engage disc 49 and force that disc rearwardly against the resistance of the co-operating spring 50, whereupon springs 48 will collapse the jaws sufficiently to release the coil. Plunger 51 has four equiangularly-spaced, peripheral grooves 52 to clear the jaws 45 of a set. It extends through a stripper plate 53 that is supported above a discharge chute 62 (Fig. 1). The released coil will drop off the collapsed jaws 45 onto the plunger 51, and be wiped off the plunger 51 by the plate 53 into the discharge chute 62, as the plunger 51 retracts.

The wire for forming the coils is adapted to be wound on each set of jaws 45 successively by a revolving flyer or feed finger 55 which is driven by a hydraulic motor designated as a whole at 56.

The hydraulic motor comprises an internally toothed gear 57 (Figs. 2 and 10) and an externally toothed gear 58. The two gears 57 and 58 are rotatably mounted in a housing 59. Hydraulic motive fluid may be supplied to this housing between the gears through a duct 60 and exhausted through a duct 61.

Keyed to the inner gear 58 is a hollow shaft 65. The flyer arm or finger 55 is carried by a collar 66 which is fastened to one end of the shaft 65. The wire W is fed from a spool or other suitable supply source through the bore of the shaft 65 to the screw eye 67 carried at the end of the flyer 55. As the flyer 55 revolves, therefore, with the shaft 65 under actuation of the hydraulic motor, the wire is wound around that set of jaws 45 that are at the winding station.

The motor 56 is secured in any suitable fashion to a slide 70 (Figs. 2 and 3) that is slidable on a dove-tail guideway 71 formed on a second slide 72. The slide 72 is adapted to reciprocate on a base 73 having a dove-tail guide portion 74 that engages corresponding ways formed on the base 73.

The slide 70 is reciprocated by means to be described hereinafter. The slide 72 is adapted to be reciprocated back and forth axially of the bar 40, which is at the winding station, in order to wind the coil of wire on the jaws 45 at that station. The reciprocating motion of the slide 72 is effected by an eccentric 75 which is secured to a shaft 76. The eccentric 75 engages at diametrically opposite sides with two parallel lugs 77 that depend from the slide 72.

The shaft 76 is driven from the shaft 65 of the hydraulic motor 56 through a pinion 80 (Figs. 1 and 2) which is keyed or otherwise secured to shaft 65. Pinion 80 meshes with a gear 81 on a shaft 82. The gears 80 and 81 are enclosed within a gear box 79, whose cover is shown removed in Fig. 1. Shaft 82 drives, through bevel gearing 83, a shaft 84. The shaft 84 drives the shaft 85 through the pulleys 86, 87 and a belt 88. Shaft 85 drives the shaft 76 through the pinion 89 and gear 90.

The slide 70 is reciprocated pneumatically to move the flyer 55 clear of the jaw heads 47 during indexing of the turret 25. For this purpose a piston 95 (Fig. 2) is provided that is reciprocable in a cylinder 97. Piston 95 is secured through a piston rod 96 to the slide 70. Cylinder 97 is fastened to slide 72.

The number of turns of wire wound in each coil is determined by the limit switch 100 (Fig. 1) which is adapted to be tripped by pins 101 that are secured to a disc 102. These pins are spaced equiangularly from one another about the axis of the disc. The disc is driven from the shaft 84 through any suitable gear reduction 103.

The turret 25 is indexed periodically to move the receiver heads 47 from the winding station through intermediate stations to the discharge station and back to the winding station again. The indexing mechanism may be of any conventional structure. As shown, it comprises gear 30 (Figs. 4, 6 and 7) which is oscillated by a rack 105 that is secured to the rod 106 of the piston 107. Piston 107 reciprocates in a cylinder 108 that is secured on base 20. Rigidly fastened to the gear 30 by screws 109 is a bar 110. Pivotally mounted on this bar by means of a pin 111 is a pawl 112. This pawl is adapted to engage the notched index plate 35. It is connected by a link 113 to a triangular toggle plate 115. The link 113 is pivotally connected at one end to the pawl 112 by a pin 116, and is pivotally connected at its opposite end to the toggle plate 115 by a pin 117. An auxiliary air cylinder 120 is pivotally mounted at 121 on the gear 30. A piston 122 reciprocates in this cylinder 120 and has its piston rod 123 pivotally connected at 124 with the toggle plate 115. The toggle plate itself is pivotally mounted at 125 on the gear 30.

In operation, when air is introduced into the main cylinder 108 through duct 130 the gear 30 and pawl 112 are turned clockwise. Simultaneously air is introduced into the auxiliary cylinder 120 through the line 132, causing its piston 122 to pivot the toggle plate 115 into the position shown in Fig. 6. This causes the link 113 to bring the pawl 112 into engagement with a notch of the index plate 35. As a result the index plate is driven by the pawl 112 until the pawl engages the stop pin 135 (Fig. 6). This completes the indexing of the turret.

At the end of the forward indexing movement the studs 116, 125, and 117 are in a straight line so that the pawl 112 is locked and held in engagement with the plate by mechanical means, and the turret is locked against rotation.

For resetting the indexing mechanism, the valve controlling the supply of air to the cylinder 108 is reversed, as will be described further hereinafter, and compressed air is introduced into the main cylinder 108 through the line 136 and is simultaneously introduced to the auxiliary cylinder 120 through the line 137. This will cause the gear 30 to turn counter-clockwise, and will release and return the pawl 112, placing the pawl in position, ready to engage a new notch on the index plate and move forward again as air is again introduced into the cylinders 108 and 120 through the lines 130 and 132. During the return idle stroke the face plate 23 (Fig. 4) and the index plate 35, which is secured thereto, are restrained from moving counterclockwise by a spring-loaded pawl 140 (Figs. 6 and 7) which is pivoted at 141 in the base 20 and which engages a notch of the index plate 35.

Upon its return movement, the piston 107 actuates a spring-pressed plunger 145 which actuates a limit switch 146. Upon its forward, indexing movement, the pawl 112 actuates a spring-pressed plunger 147 which operates a limit switch 148. The limit switches 100 (Fig. 1) and 146 and 148 (Figs. 6 and 7) control the cycle of operation of the machine.

The movements of the piston 107 (Figs. 6 and 7) are controlled by two conventional solenoid-operated valves 150 and 151 (Fig. 12). These valves control the movement of a sliding valve 152. The movements of the piston 95 (Fig. 2) are controlled by two valves 155 and 156 (Fig. 12). The direction of flow of the motive fluid to the motor 56 is controlled by a sliding valve 160 (Fig. 12) which is controlled by two conventional solenoid-operated valves 161 and 162. The valves 150, 151, 155, 156, 161 and 162 are all identical in construction. Each comprises a reciprocable valve member 165 (see valve 155, Fig. 12) which constitutes the armature of a solenoid. Each has a lower seat 166 and an upper seat 167. Normally each armature valve member 165 rests on the lower seat 166. In this position the valve is closed, and the duct controlled by the valve is open to exhaust. When the solenoid coil of the valve (168 in the case of valve 155) is energized, however, the member 165 is lifted off seat 166 and is seated on seat 167. This opens the valve so that compressed air is supplied to the duct controlled by the valve.

The hydraulic motive fluid is pumped from a sump 195 in the base of the machine through a line 196 by means of a pump 197 that is driven by an electric motor 198. The pump delivers the pressure liquid through line 199 to a line 193. Line 193 leads to the slidable valve 160 which controls hydraulic motor 56 (Figs. 2 and 12). There is a relief valve 200 in the line 199, which permits excess fluid to flow back to the sump through the line 201. The valve 160 is connected by line 202 with the sump.

The parts are shown in Fig. 12 in the positions which they occupy when the machine is stopped. The index mechanism is in its reset position shown in Fig. 7. Switch 148, which is a normally open switch, is, therefore, open, and switch 146, which is also a normally open switch, is closed. The flyer head is in its withdrawn position, piston 95 (Fig. 2) being at the right hand end of its cylinder 97; and the hydraulic motor 56 is stopped. All of valves 150, 161, 156, 151, 162 155 are in their down positions in which they are closed to compressed air supply but are open to exhaust.

To start the machine, the operator closes the starter switch 170 (Fig. 11). This closes a circuit from main line L₁ through the switch 170, line 171, the now-closed switch 146, the line 172, the solenoid coil 173 of valve 150, and the line 175 back to the main line L₂. Simultaneously a circuit is closed to coil 177 of a conventional relay through the line 176, relay coil 177, and line 178.

Energizing of solenoid coil 173 opens valve 150. This causes the compressed air from a main supply line 190, which may be connected to any adequate source of compressed air supply, to be supplied through lines 186 and 187 (Fig. 12), now-open valve 150, and line 188 to the left-hand end of valve 152 shifting this valve to the right. This puts line 130 (Figs. 12, 6 and 7) on supply from line 186, and line 136 on exhaust, the latter exhausting through line 189 to the atmosphere. Simultaneously line 132 to auxiliary cylinder 120 (Figs. 12, 6 and 7) is put on supply from line 130, and line 137 from the auxiliary cylinder is put on exhaust through line 136. This causes the index mechanism to be actuated to index the turret.

Energizing of relay coil 177 shifts the switch arm 182 of this relay which would otherwise break the circuit which would otherwise be made to the solenoid coils 183, 184 and 185 of the valves 161, 156, and 151, upon closing of starter switch 170, thus causing these valves to remain in their down, closed positions.

When the piston 107 (Figs. 6 and 7) moves away from push rod 145, switch 146 opens. This breaks the circuit to the solenoid coil 173 of valve 150 (Figs. 11 and 12), and also breaks the circuit to relay coil 177. Breaking of the circuit to coil 173 permits the valve 150 to close, but since valve 151 is at this time closed also, valve 152 (Fig. 12) is not shifted. Breaking of the circuit to relay coil 177 deenergizes that coil but switch 182 (Fig. 11) remains in its upper position.

When the pawl 112 (Figs. 6 and 7) engages the push rod 147 at the end of the indexing movement, switch 148 closes. This closes a circuit from main line L₁, through switch 170, line 171, line 225, switch 148, line 226, solenoid coil 227 of valve 162, and lines 228 and 175 to main line L₂, energizing coil 227 and opening valve 162. Simultaneously coil 168 of valve 155 is energized from line 226 through lines 229 and 230, thus opening valve 155.

Opening of valve 162 causes compressed air to be supplied from main line 190 (Fig. 12) through lines 191 and 192, now-open valve 162 to the left hand side of valve 160. Since valve 161 is already in its down (closed) position, valve 160 will be shifted to the right from the position shown in Fig. 12. This connects line 60 to hydraulic pressure line 193. Hence, the hydraulic motive liquid is supplied to the motor 56, starting the motor. This drives flyer 55, disc 102 (Fig. 1), and eccentric 75 (Fig. 2) which reciprocates the slide 72 on which the hydraulic motor and the flyer are mounted.

Opening of valve 155 causes compressed air to be supplied from main line 190 (Fig. 12) through lines 191, 210 and 211 to the right hand end of piston 95 (Figs. 12 and 2), causing the slide 70 with the hydraulic motor and flyer to be moved into operative position. Therefore, as the shaft 65 and flyer 55 continue to rotate under actuation of hydraulic motor 56 the flyer revolves about the sets of jaws 45 which are at the winding station and simultaneously moves axially of the motor, back and forth, winding wire in a helical coil upon the set of jaws.

Opening of valve 155 also causes compressed air to be supplied from main line 190 through lines 210 and 215 to the upper end of the cylinder 54. This causes the piston 236 to move plunger 51 (Figs. 1, 9 and 12) to the left in Fig. 9, forcing the disc 49 to the left against the resistance of the spring 50, thereby permitting the springs 48 to collapse the jaws 45 of the head 47 which is at the discharge stage. The coil, which has been wound on its head, is thereby discharged onto the plunger 51. When this plunger is subsequently retracted, the completed coil will be dropped into the discharge chute 62, being wiped off the plunger 51 by the plate 53.

The disc 102 (Fig. 1) revolves slowly, its rate of rotation being governed by the gear reduction 103. When the desired amount of wire has been wound into a coil upon the jaws 45 at the winding station, the disc 102 will have revolved far enough for its next pin 101 to engage and shift switch 100 from the full line position shown in Fig. 11 to the dotted line position shown in that Figure. A circuit will thus be made to relay coil 221 from line 171 through line 180, switch 100, line 220, coil 221, and line 222. This will pull switch 182 to the position shown in Fig. 11, thereby closing circuits to the solenoid coils 183, 184 and 185 of the valves 161, 156 and 151, respectively.

The energizing of solenoid coil 185 will open valve 151. This will cause compressed air to be supplied from main line 190 (Fig. 12) through lines 186 and 232, now open valve 151, and line 233 to the right hand side of valve 152. Since valve 150 is already closed, this will shift valve 152, putting lines 132 and 130 on exhaust through port or duct 234, and putting lines 136 and 137 on supply from line 186. This will cause resetting of the index mechanism.

The energizing of solenoid coil 184 will open valve 156. This will cause compressed air to flow from the main line 190 through the duct 216 to the lower end of cylinder 54, causing the plunger 51 to be retracted so that the completed coil will be swept by plate 53 into the discharge chute 62. At the same time, compressed air will be supplied from main line 190 through duct 212 to the left hand end of cylinder 97 to move piston 95 to the right, and retract flyer arm 55.

Switch 148 will open as soon as pawl 112 (Figs. 6 and 7) moves away from rod 147. This will break the circuits to solenoid coils 227 and 168 of valves 162 and 155, allowing valves 162 and 155 to close.

The energizing of solenoid coil 183 of valve 161, opens valve 161. Since valve 162 is closed, valve 160 is moved to the left, so that supply of the hydraulic motive fluid is cut off from the motor 56. The motor 56 will therefore stop instantaneously; it will not coast. The precise, desired number of turns will, therefore, be wound in the coil on the jaws 45 then at the winding station.

The energizing of the coil 184 (Fig. 11) of the valve 156 causes the compressed air to flow from the main line 190 through the line 212 (Fig. 12) to the left-hand face of the piston 95 (Figs. 2 and 12), withdrawing the slide 70 and the winding head from operating position. Since the valve 155 is at this time closed, the right-hand end of the piston 95 is on exhaust through the line 211, and the valve 155 to atmosphere.

When the piston 107 (Figs. 6 and 7) at the end of its resetting movement bottoms in the right hand end of cylinder 108 as shown in Fig. 7 it closes limit switch 146. This again closes a circuit to coil 173 of valve 150 and to relay coil 177. Valve 150 is, therefore, reopened; and switch 182 is, therefore, shifted to break the circuit between lines 181 and 179.

The shifting of valve 150 opens that valve. The breaking of the circuit between lines 181 and 179 de-energizes solenoid coils 183, 184 and 185, permitting valves 161, 156 and 151 to close.

The opening of valve 150 and the closing of valve 151 causes valve 152 (Fig. 12) to be moved to the right to put lines 130 and 132 on supply and lines 137 and 136 on exhaust. The turret is, therefore, indexed to move the completed coil from the winding station, and to bring another arm 40 and its set of jaws 45 to the winding station.

In its indexing movement, piston 107 (Figs. 6 and 7) moves away from plunger 145. Thus limit switch 146 reopens. This breaks the circuit to valve 150 and to relay coil 177. Switch 182 remains in its upper position, however, since the relay employed is a conventional latching relay.

When the indexing movement is completed, pawl 112 (Figs. 6 and 7) will again close limit switch 148. This will again energize coils 227 and 168 of valves 162 and 155, respectively.

Valves 162 and 155 will, therefore, be opened. Valve 160 (Fig. 12) will, therefore, be moved to the right, permitting the hydraulic motive fluid to flow once more to motor 56, restarting the motor.

Opening of valve 155 will cause piston 95 (Figs. 2 and 12) to be moved to the left to move the flyer back to operating position so that it winds the wire being fed through shaft 65 onto the new set of jaws at the winding station. Opening of valve 155 will also put the upper end (Fig. 12) of cylinder 54, in which the piston 236, to which stripper rod 51 (Fig. 9) is secured, reciprocates, on supply. This will cause the jaws 45 of the set that is at the discharge station to be collapsed and to drop that coil onto plunger 51 whence it will be swept into the discharge chute 62 (Fig. 1) on subsequent retraction of the plunger.

As the motor starts to turn, disc 102 (Fig. 1) also starts to rotate, moving the pin 101, that has been in engagement with switch 100, away from that switch. Thus the switch returns to the full line position of Fig. 11. The cycle continues as already described. When another pin 101 hits switch 100, relay coil 221 is again energized, moving switch 182 down to the position shown in Fig. 11. This causes the motor 56 to be stopped, the flyer slide 70 to be withdrawn from operating position, and the index mechanism to be reset as already described. Then the turret is indexed and a new cycle begins with a coil being wound upon a new set of jaws 45 at the winding station, and a coil being discharged into chute 62 at the discharge station as already described. The operation of the machine is continuous once it is started until switch 170 (Fig. 11) is opened.

The operator of the machine stations himself or herself at a convenient point around the machine and at one station, for instance the third station, places a strip of adhesive tape around the coil which has been formed at the winding station, and snips the wire connecting that coil with the coil at the following (second) station. For the remaining stations nothing happens to the separated coil, until the coil has been indexed to the discharge station, where the rod 51 is moved forward to push the block 49 out of the way and allow the springs 48 to collapse the jaws, releasing the coil, and dropping it, as stated, onto plunger 51 whence it is discharged into the chute on the subsequent retracting movement of the plunger.

From the preceding description it will be seen that I have provided an automatic machine which is simple in construction, which is continuous in operation, once started, and which will wind a precise, accurate number of turns of wire into a coil in each cycle of its operation. The only manual operations required are placing of a strip of adhesive tape or other holding means about a coil after it has been wound and snipping of the wire to separate one coil from the next. These might be made automatic also, if desired. Since the labor involved in these operations is, however, negligible, it is ordinarily not necessary to provide automatic means for performing these operations; and since it is ordinarily desirable to keep the cost of the machine to a minimum, the machine disclosed is the present preferred embodiment of my invention.

While the invention has been disclosed, however, in connection with this embodiment, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a coil winding machine, a hydraulic motor comprising an internally toothed member and an externally toothed member rotatable within said internally toothed member, a shaft extending coaxially through said externally toothed member and secured thereto to rotate therewith, said shaft being hollow so that wire may be fed therethrough, a flyer arm secured to the forward end of said shaft, a guide member secured to said arm in offset relation to the axis of said shaft, and a coil support disposed in position to have wire wound thereon as said arm rotates with said shaft.

2. In a coil winding machine, a coil support comprising a plurality of pivoted jaws, spaced equi-angularly about a common axis, means constantly urging said jaws about their respective pivots toward said axis to move the jaws to collapsed position, and means for holding said jaws in extended, coil-supporting position.

3. In a coil winding machine, a coil support comprising a plurality of pivoted jaws spaced equi-angularly about a common axis, spring means constantly urging each of said jaws to rock about its pivot toward said axis to collapse the jaws, a spring-pressed member engaging all of said jaws to move them against said spring means to hold the jaws in extended, coil-supporting position, spring means for actuating said member, and means for moving said member against the resistance of the last-named spring means to collapse said jaws.

4. In a coil-winding machine, a coil support comprising a plurality of pivoted jaws spaced equi-angularly about a common axis, a spring engaging each of said jaws to urge it about its pivot toward said common axis to collapse the jaws, a member reciprocable between said jaws, spring means urging said member in one direction about said common axis to move said jaws against said springs to extended, coil-supporting position, and a plunger movable into engagement with the said member to force said member in the opposite direction along said common axis against the resistance of said spring means to collapse said jaws.

5. In a coil winding machine, a slide, a hydraulic motor mounted on said slide, said motor comprising an internally toothed member and an externally toothed member rotatable within said internally toothed member, a shaft extending coaxially through said externally toothed member and secured thereto to rotate therewith, said shaft being hollow so that wire may be fed therethrough, a flyer arm secured to the forward end of said shaft, a wire-guiding member secured to said arm in offset relation to the axis of said shaft, a coil support disposed in position to have wire wound thereon as said arm rotates with said shaft, means for reciprocating said slide to cause successive turns of wire to be wound helically on said support, means for reciprocating said slide to move said arm to and from operative relation with said support, and means for stopping said motor after a predetermined number of revolutions of said shaft.

6. In a coil winding machine, a base, a slide reciprocable on said base, a second slide reciprocable on the first-named slide, a hydraulic motor mounted on the second slide, said motor comprising an external member and an internal member rotatable within said external member, a shaft extending coaxially through said internal member and secured thereto to rotate therewith, said shaft being hollow so that wire may be fed therethrough, a flyer arm secured to the forward end of said shaft, a wire guiding member secured to said arm in offset relation to the axis of said shaft, a coil support disposed in position to have wire wound thereon as said arm rotates with said shaft, means for reciprocating one of said slides to cause successive turns of wire to be wound helically on said support, means for reciprocating the other slide to move said flyer arm to and from operative relation with said support, and means for stopping said motor after a predetermined number of revolutions of said shaft.

7. In a coil-winding machine, a rotary turret, a plurality of collapsible coil supports mounted on said turret in equi-angularly spaced relation about the axis of said turret, each of said supports comprising a plurality of jaws upon which a coil may be wound, means for constantly urging said jaws to extended, coil-supporting position, means for indexing said turret periodically on its axis to move the coil supports successively from a coil-winding station to a coil-discharging station, a rotary flyer arm positioned at the coil-winding station, means for rotating said arm to wind a coil of wire on the coil support which is at the coil-winding station, means for automatically stopping rotation of said arm when a predetermined number of turns of wire has been wound in said coil, means for automatically actuating said indexing means to index said turret about its axis to move a coil support from and to bring a new coil support to the coil-winding station, means for automatically restarting rotation of said arm when the indexing operation has been completed, and means for automatically collapsing the jaws of each coil support at the discharge station to release the coil wound thereon.

8. In a coil winding machine, a rotary turret, a plurality of collapsible coil supports mounted on said turret in equi-angularly spaced relation about the axis of said turret, fluid-pressure operated means for indexing the turret periodically about its axis to move the coil supports successively from a coil-winding station to a coil-discharging station, a rotary flyer arm positioned at the coil-winding station, means including a hydraulic motor coaxial with said arm for rotating said arm to wind a coil of wire on the coil support which is at the coil-winding station, means driven from said motor for automatically stopping said motor when a predetermined number of turns of wire has been wound in said coil, means for automatically actuating said indexing means to index said turret when said motor has been stopped, means for automatically restarting said motor when the indexing operation has been completed, fluid-pressure operated means for collapsing each coil support automatically at the discharge station to release the coil which has been wound thereon, and means interlocking said motor and the first-named fluid pressure operated means.

9. In a coil winding machine, a rotary turret, a plurality of coil supports mounted on said turret in equi-angularly spaced relation about the axis of the turret, mechanism for indexing the turret to move the coil supports successively from a coil-winding station to a coil-discharging station, a first fluid-pressure operated means for actuating said indexing mechanism and for resetting said indexing mechanism after an indexing operation has been completed, a rotary flyer arm positioned at the coil-winding station, means including a hydraulic motor coaxial with said arm for rotating said arm to wind a coil of wire on the coil support which is at the coil-winding station, a valve controlling flow of the hydraulic motive fluid to said motor, means driven by said motor for automatically shifting said valve to stop flow of said hydraulic motive fluid to said valve when a predetermined number of turns have been wound in said coil, means connected to said index mechanism to be operated upon completion of the indexing operation to reverse said valve to permit flow of said hydraulic motive fluid again to said motor, a second fluid-pressure operated means for moving said arm to and from operative position, a second valve for controlling the direction of flow of the pressure fluid to said second fluid-pressure operated means, means connecting said second valve to said index mechanism so that said second valve is shifted to cause said arm to be moved to operating position upon completion of the indexing operation, means connecting said motor driven means to said first valve to cause resetting of said index mechanism when a predetermined number of turns have been wound on said coil and for simultaneously operating said second valve to retract said arm from operative position, and means operable when the index mechanism has been reset to shift said first valve again to actuate said index mechanism and restart the cycle.

References Cited in the file of this patent

UNITED STATES PATENTS

| | | |
|---|---|---|
| 469,943 | Jeffery | Mar. 1, 1892 |
| 709,179 | Schulz | Sept. 16, 1902 |
| 1,401,520 | Clauss | Dec. 27, 1921 |
| 1,435,805 | Clayton | Nov. 14, 1922 |
| 1,771,927 | Illingworth | July 29, 1930 |
| 1,993,721 | Pigott | Mar. 5, 1935 |
| 1,995,105 | Poole | Mar. 19, 1935 |
| 2,053,764 | Chapman | Sept. 8, 1936 |
| 2,114,287 | Cullin | Apr. 19, 1938 |
| 2,154,595 | Weirich | Apr. 18, 1939 |
| 2,241,602 | Kinyon | May 13, 1941 |
| 2,246,608 | Taylor | June 24, 1941 |
| 2,279,323 | Johnson | Apr. 14, 1942 |
| 2,447,982 | Koster | Aug. 24, 1948 |
| 2,466,227 | Gilman | Apr. 5, 1949 |
| 2,627,379 | Moore | Feb. 3, 1953 |
| 2,638,943 | Bugg | May 19, 1953 |
| 2,671,410 | Wahlmark | Mar. 9, 1954 |
| 2,712,836 | Marzolf | July 12, 1955 |